United States Patent [19]

Kondo et al.

[11] 4,229,052

[45] Oct. 21, 1980

[54] HYDRAULIC PRESSURE CONTROL SYSTEM FOR SPLIT BRAKE SYSTEM

[75] Inventors: Toshiyuki Kondo, Anjo; Masamoto Ando, Toyota, both of Japan

[73] Assignee: Aisin Seiki Company, Limited, Kariya, Japan

[21] Appl. No.: 2,179

[22] Filed: Jan. 9, 1979

[30] Foreign Application Priority Data

Jan. 26, 1978 [JP] Japan .................................. 53-7635

[51] Int. Cl.³ ........................... B60T 8/10; B60T 8/26
[52] U.S. Cl. .................................... 303/115; 303/6 C
[58] Field of Search .................. 188/181 A; 303/6 C, 303/102, 106, 113-115, 119

[56] References Cited

U.S. PATENT DOCUMENTS

| | | | |
|---|---|---|---|
| 3,556,609 | 1/1971 | MacDuff ............................ | 303/115 |
| 3,917,355 | 11/1975 | Takeuchi ........................... | 303/6 C |
| 3,993,364 | 11/1976 | Chiba et al. ................. | 188/181 A X |
| 4,027,924 | 6/1977 | Kondo ................................. | 303/115 |

*Primary Examiner*—Duane A. Reger

*Attorney, Agent, or Firm*—Oblon, Fisher, Spivak, McClelland & Maier

[57] ABSTRACT

A hydraulic pressure control system for a split brake system including a tandem master cylinder, first and second wheel brakes, a first braking line between one of the tandem master cylinder and the first wheel brake, a second braking line between the other of the tandem master cylinders and the second wheel brake, an anti-skid actuator positioned within the first braking line to thereby decrease and increase brake fluid pressure transmitted to the first wheel brake in response to rotational conditions of the wheels, and a control valve assembly communicating with the first braking line between the anti-skid actuator and the first wheel brake at a first side thereof, and communicating with the second braking line at a second side thereof, the control valve assembly including a normally open valve member interrupting the second braking line when fluid pressure within the first braking line attains a predetermined value, and balance piston means being balanced by means of fluid pressure transmitted to the first and second wheel brakes, respectively, to thereby maintain the fluid pressures of the first and second wheel brakes at the same magnitude.

8 Claims, 3 Drawing Figures

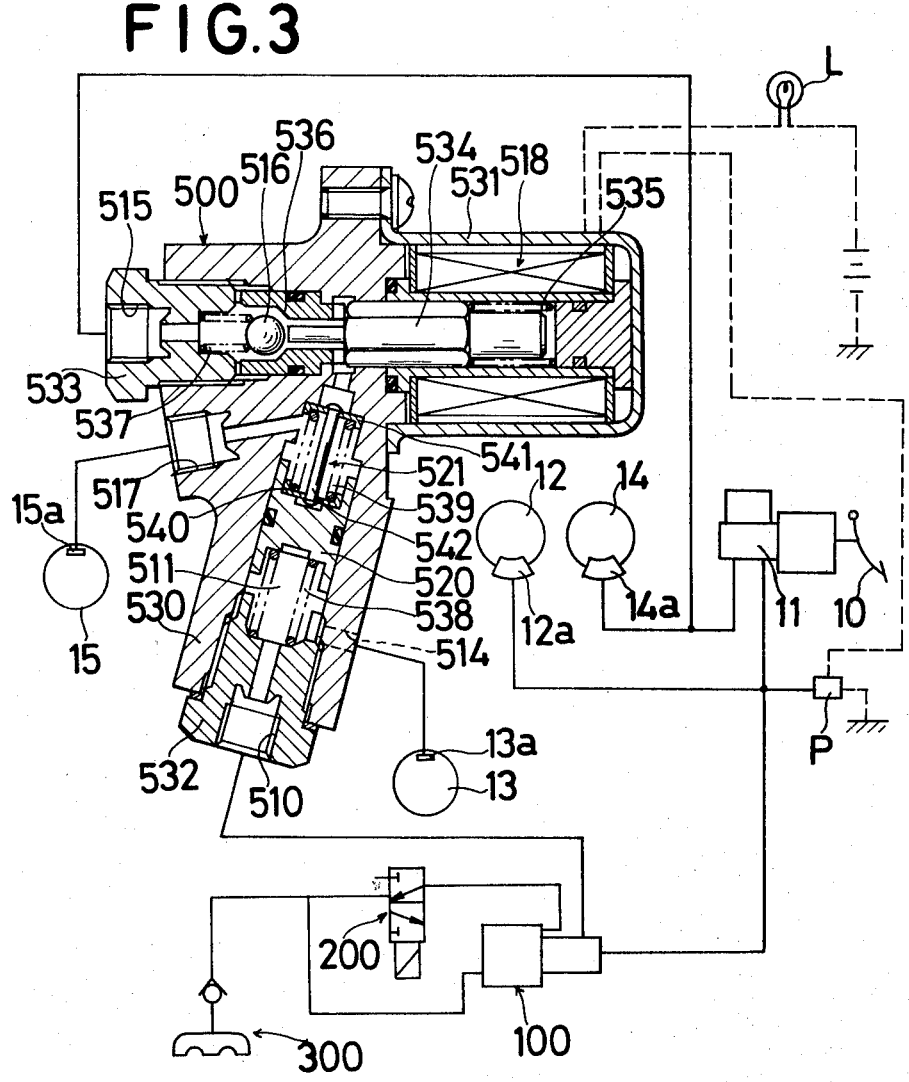

HYDRAULIC PRESSURE CONTROL SYSTEM FOR SPLIT BRAKE SYSTEM

BACKGROUND OF THE INVENTION

1. Field of the Invention

This invention relates to a hydraulic pressure control sytems, and more particularly to hydraulic pressure control systems for split brake systems for vehicles.

2. Description of the Prior Art

Vehicle braking systems are today required to provide a sufficient braking force by means of one braking line of a split brake system even when the other of the braking lines fails to operate. Therefore, in such a split brake system, each braking line has to be arranged independently in operation. Thus, in case it is desirable to arrange anti-skid control devices in such a split brake sytem, and individual anti-skid control device has to be arranged within each of the braking lines. Accordingly, prior split brake systems have been high in cost and complex in construction. Furthermore, it has been more difficult to install the split brake systems within the limited space provided in the vehicle.

SUMMARY OF THE INVENTION

Therefore, an object of the present invention is to provide an improved hydraulic pressure control system for a split brake system which overcomes the various drawbacks of the prior systems.

Another object of the present invention is to provide an improved hydraulic pressure control system for a split brake system which is simple in construction and low in cost.

Still another object of the present invention is to provide an improved hydraulic pressure control system for a split brake system wherein anti-skid functions relating to a plurality of braking lines will be assured by means of a single anti-skid control device.

BRIEF DESCRIPTION OF THE DRAWINGS

Various other objects and many of the attendant advantages of the present invention will be readily appreciated as the same become better understood by reference to the following detailed description when considered in connection with the accompanying drawings wherein:

FIG. 3 is a view similar to FIG. 1 but showing a modification of the present invention.

DETAILED DESCRIPTION OF THE PREFERRED EMBODIMENTS

Figure 1:
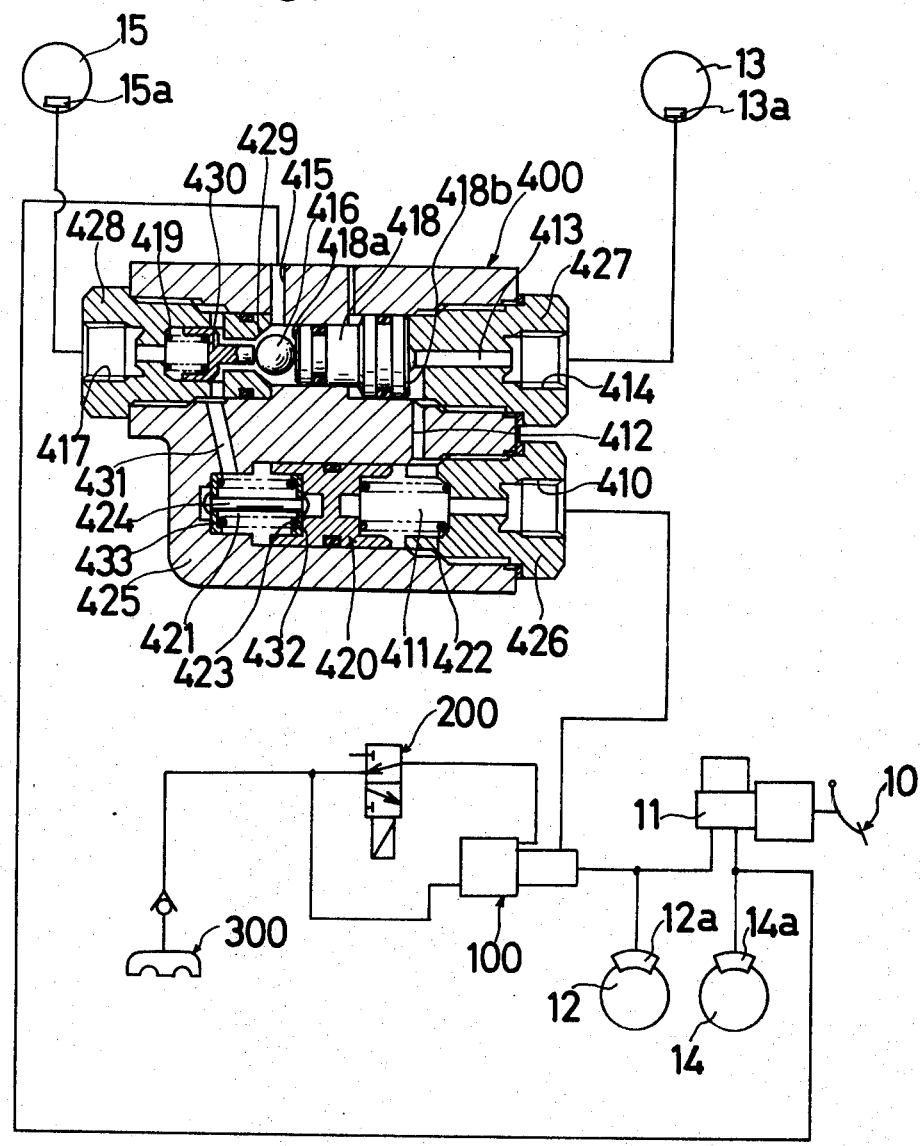
FIG. 1 is a schematic view of a hydraulic pressure control system for split brake system, with a hydraulic control valve assembly illustrated in cross-section according to the present invention.
Figure 2:
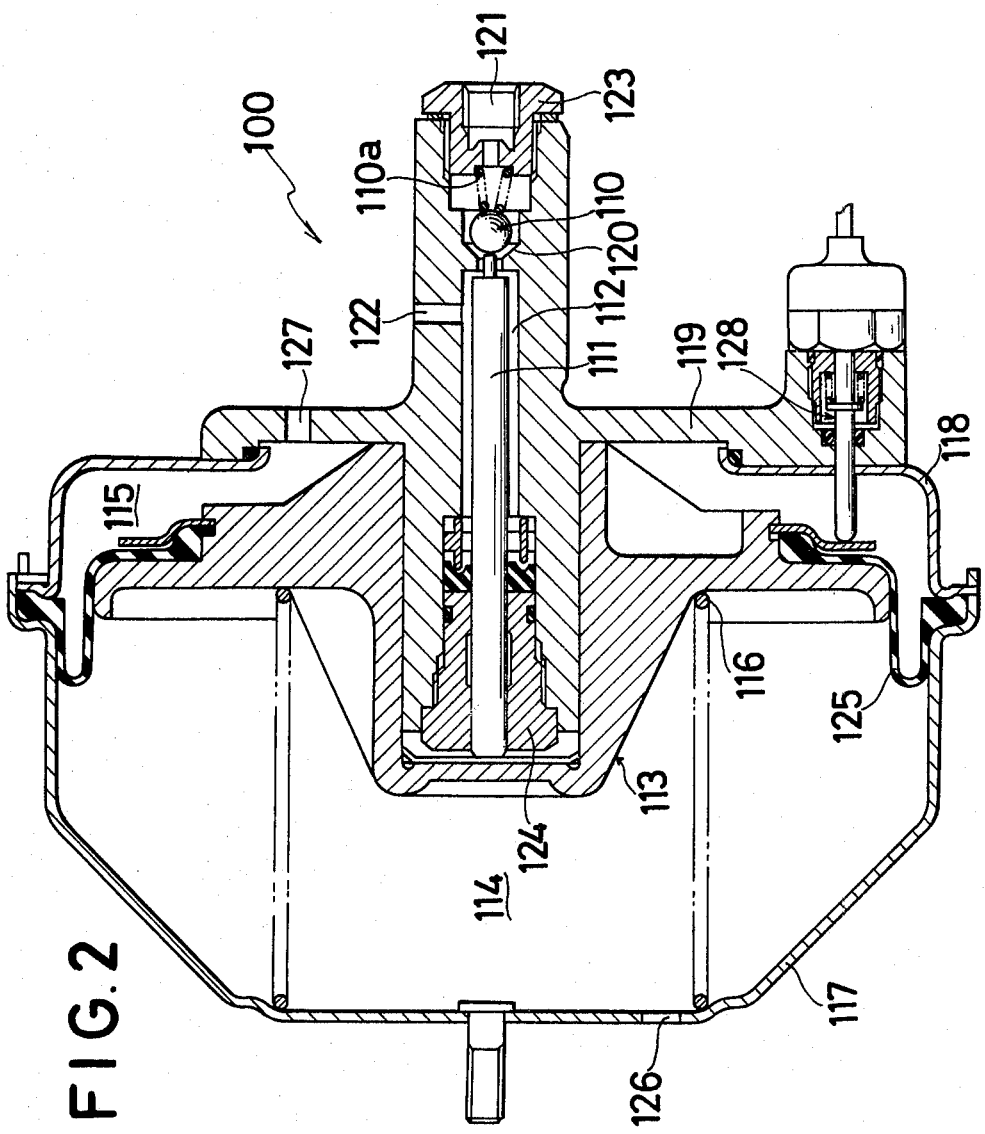
FIG. 2 is a cross-sectional view of an anti-skid actuator incorporated in the brake system of FIG. 1.

Referring now to FIGS. 1 and 2 showing a first embodiment of the present invention, shown therein is a two-split brake system of a diagonal type. A conventional tandem master cylinder 11 is operatively connected to a brake pedal 10. The braking fluid pressure generated within one chamber of the tandem master cylinder 11 is transmitted through means of a first braking line to a wheel brake 12a of a left front wheel 12 and a wheel brake 13a of a right rear wheel 13, while the braking fluid pressure generated within the other of the tandem master cylinder 11 is transmitted through means of a second braking line to a wheel brake 14a of a right front wheel 14 and a wheel brake 15a of a left rear wheel 15.

An anti-skid control system which is incorporated into the above-noted two-split brake system includes an anti-skid actuator 100, the detailed construction of which is illustrated in FIG. 2, an air-vacuum change-over valve 200 which causes the actuator 100 to operate and an engine intake manifold 300 operating as a working vacuum pressure source. The anti-skid actuator 100 is positioned within the above first braking line to thereby control or modulate the braking fluid pressure which is led to the right rear wheel brake 13a in this embodiment. It is obvious, however, that the anti-skid actuator 100 may be positioned within the second braking line.

In FIG. 2, the anti-skid actuator 100 includes first, second and third bodies 117, 118 and 119 secured to one another. Disposed within the body 119 is a cut-off valve 110 which cooperates with a seat 120 on the body 119 to thereby provide an on-off control of the fluid communication between an inlet port 121 and an outlet port 122 The inlet port 121 is provided in a plug 123 threaded with the body 119 and is adapted to receive the braking fluid pressure from one chamber of the tandem master cylinder 11, and the outlet port 122 provided in the body 119 is hydraulically connected to the right rear wheel brake 13a through means of a control valve assembly 400 (shown in FIG. 1) which is described in detail hereinafter.

A braking fluid pressure reducing piston 111, which is slidably arranged within a stationary member 124 threaded with the body 119, has a right end which is normally in contact with the cut-off valve 110 to thereby hold the latter in its opening position. The right major part of the pressure reducing piston 111 is exposed to a variable volume chamber 112 and thus the effective volume of chamber 112 is increased in response to the leftward movement of the piston 111 as will be clear from the discussion provided hereinafter. The left end of the pressure reducing piston 111 is adapted to be continuously in contact with a power piston 113 so that the piston 111 is normally maintained in its illustrated position. The power piston 113 has at the outer periphery thereof a diaphragm member 125 which, in turn, is held at its outer periphery by bodies 117 and 118.

The power piston 113 and the diaphragm member 125 define a vacuum chamber 114 and a variable pressure chamber 115 within bodies 117, 118 and 119, the vaccum chamber 114 constantly receiving vacuum pressure through means of a vacuum port 126 provided in the body 117 from the intake manifold 300 which the variable pressure chamber 115 is in communication with the air-vacuum change-over valve 200 through means of a port 127 provided in the body 119. A spring 116 arranged between the power piston 113 and the body 117 continuously biases the power piston 113 toward the right as viewed in FIG. 2. Power piston 113, both chambers 114 and 115, spring 116 and the like constitute the servo mechanism for the anti-skid actuator 100 having cut-off valve 110, pistion 111, variable volume chamber 112 and the like. Reference numeral 128 denotes a conventional switch mechanism which detects the operating conditions of the anti-skid actuator 100.

Referring now to FIG. 1, the air-vacuum change-over valve 200 may be constructed as a conventional solenoid valve which operates in response to instructing signals from conventional wheel sensors which, in turn, detect revolutional speeds of the wheels. When the change-over valve 200 is in a non-operating mode versus the illustrated position, the change-over valve 200 permits fluid communication between the intake manifold 300 and the variable pressure chamber 115 of the servo mechanism for the actuator 100. When the solenoid change-over valve 200 is energized and moved into its operating position as shown, the change-over valve 200 interrupts the fluid communication between the intake manifold 300 and the variable pressure chamber 115 and allows fluid communication between the atmospheric pressure source and the variable pressure chamber 115. The construction and operation of the change-over valve 200 itself is well-known in the art such that a detailed explanation thereof is omitted.

The control valve assembly 400 is positioned within the first braking line between the actuator 100 and the right rear wheel brake 13a at one side thereof and is positioned within the second braking line between the master cylinder 11 and the left rear wheel brake 15a at the other side thereof. The control valve assembly 400 includes a housing 425 having three plugs 426, 427, and 428 threaded therewith. The plug 426 has a first inlet port 410 which recieves the braking fluid pressure from the variable volume chamber 112 of the actuator 100. The first inlet port 410 is hydraulically connected to the right rear wheel brake 13a through means of a chamber 411 between the plug 426 and a balance piston 420, a passage 412 provided in the housing 425, a passage 413 provided in the plug 427 and a first outlet port 414 provided in the plug 427. A second inlet port 415 which is formed in the housing 425 receives the braking fluid pressure from the other of the tandem master cylinder 11. The braking fluid pressure within the inlet port 415 is transmitted to the left rear wheel brake 15a through means of a ball valve 416 which is normally held in its opening position and a second outlet port 417 provided in the plug 428.

An upper bore provided in the housing 425 slidably receives a stepped piston 418 therein. The stepped piston 418 has a left end 418a of comparatively small diameter, which is in contact with the ball valve 416 and is subjected to braking fluid pressure from the second inlet port 415, and has a right end 418b of comparatively large diameter which is subjected to the braking fluid pressure within passages 412 and 413 between the actuator 100 and the right rear wheel brake 13a. Thus, the stepped piston 418 is oppositely urged by means of both braking fluid pressures within first and second braking lines, and is disposed so as to be moved toward the left due to the difference in effective areas between both ends 418a and 418b of the stepped piston 418 when the braking fluid pressures attain a predetermined value, for example, 5 kg/cm$^2$ during the initial braking operation. The leftward movement of the piston 418 urges the same against a spring 419 such that the ball valve 416 is biased to its closed position where the ball valve 416 is seated against a seat 429 provided on the plug 428. The ball valve 416 is normally held in its open position by means of a right end portion of a spring retainer 430.

Within a lower bore provided in the housing 425 is disposed balance piston 420 which is arranged in parallel with the stepped piston 418. One end of the balance piston 420 is exposed to the chamber 411 and the other end thereof is exposed to a chamber 421 which is connected to the outlet port 417 through means of a passage 431 provided in the housing 425. Thus, the balance piston 420 is slidably moved in response to the difference in braking fluid pressures within the chambers 411 and 421. The balance piston 420 is normally maintained in its illustrated or non-operating position by means of a pair of springs 422 and 423 which are positioned within the chambers 411 and 421, respectively, to thereby oppositely bias the balance piston 420. A rod 424 extends through spring retainers 432 and 433 and has at both ends thereof large diameter portions. Thus, rod 424 normally limits the position of the retainer 432, namely, the leftward movement of the balance piston 420, but allows leftward movement of the retainer 432 and the balance piston 420 when the difference in the braking fluid pressures within the chambers 411 and 421 attains a predetermined value.

In normal brake operation, when the brake pedal 10 is depressed, the braking fluid pressures which are independently generated within the tandem master cylinder 11 are transmitted to wheel brakes 12a and 13a through means of the above-mentioned first braking line at one side thereof and to wheel brakes 14a and 15a through means of the above-mentioned second braking line at the other side. When the master cylinder pressures, which are the same at both of braking lines, reach the predetermined value, the stepped piston 418 is moved to the left in the manner mentioned above so that the ball valve 416 is caused to be in contact with the seat 429 to thereby interrupt the fluid communication between the second inlet port 415 and the second outlet port 417. Therefore, the braking fluid pressure at the left rear wheel brake 15a, which is the same as that within the chamber 421, is separated from the master cylinder 11. However, since the braking fluid pressure within the chamber 411 still increases, a difference in the fluid pressures within the chamber 411 and 421 is generated. Due to the above-noted difference in the fluid pressures, balance piston 420 is moved to the left to thereby reduce the volume of the chamber 421, and is thus balanced by means of both fluid pressures within the chambers 411 and 412. Accordingly, the braking fluid pressure which is communicated to the left rear wheel brake 15a is increased to the same pressure as that within the wheel brake 13a.

When the wheels are locked or are substantially locked during the above-noted normal braking operation, the air-vacuum change-over valve 200 is operated in response to the signals received from wheel sensors in a conventional manner to thereby interrupt the fluid communication between the intake manifold 300 and the variable pressure chamber 115 of the actuator 100 to thereby allow the introduction of atmospheric pressure into the variable pressure chamber 115. Therefore, a difference in the fluid pressures within chambers 114 and 115 is now generated such that the power piston 113 having diaphragm 125 is caused to be moved to the left against the spring 116. The pressure reducing piston 111 follows by means of the fluid pressure within the variable volume chamber 112, and thus the cut-off valve 110 is seated against the seat 120 by the spring 112a. The leftward movement of the piston 111 increases the effective volume of the chamber 112 which leads to the right rear wheel brake 13a by means of the control valve assembly 400. This results in a decreasing of the braking fluid presssure at the wheel brake 13a to prevent a skid condition of the wheels.

During the above-mentioned anti-skid operation, balance piston 420 is moved toward the right since the fluid pressure within the chamber 411 is reduced such that the braking fluid pressure at the left rear wheel brake 15a is correspondingly decreased.

During the anti-skid operation, the stepped piston 418 may be moved to the right by means of the fluid pressure at the inlet port 415 because the fluid pressure at the passage 413 is reduced. However, ball valve 416 is still maintained in its closed position by means of the master cylinder pressure at the inlet port 415. When the skid condition of rear wheels 13 and 15 are released, the air-vacuum change-over valve 200 is returned to its illustrated or original position, and the balance piston 420 is also returned to its original position. It can thus be appreciated that the decreasing and increasing of the braking fluid pressures will be cyclically repeated to prevent skid conditions.

As will be clearly explained hereinbelow, the fluid pressure which is controlled by the anti-skid actuator 100 is transmitted to the control valve assembly 400 as pilot pressure and thus the anti-skid operations relating to both braking lines including wheel brakes 13a and 15a can be assured by means of a single anti-skid system, namely, the single anti-skid actuator 100.

Turning to FIG. 3 illustrating a modification of the present invention wherein the same or similar parts are designated by the same reference numerals as those in the previous embodiment, a control valve assembly 500 according to this modification is electrically operated in response to electrical signals from a fluid pressure responsive switch device P which is positioned within the first braking line between the tandem master cylinder 11 and the anti-skid actuator 100. The control valve assembly 500 has first and second bodies 530 and 531 which are secured to each other, the first body 530 having first and second plugs 532 and 533 threaded therewith. Disposed within the body 531 is a normally deenergized solenoid 518 which is energized by means of electrical signals generated from a switch P when the master cylinder pressure reaches a predetermined value, for example, 5 kg/cm$^2$. A member or piston core 534 is slidably positioned within the solenoid 518, and is normally urged toward the left by means of a spring 535 to thereby space a ball valve 516 from a corresponding seat 536. When the solenoid 518 is energized, the core 534 is moved to the right such that the ball valve 516 is contacted with the seat 536 by means of a spring 537. Thus, fluid communication between an inlet port 515 leading to the other of the tandem master cylinder 11 and an outlet port 517 leading to the left rear wheel brake 15a is controlled as to on-off positioning. Namely, the solenoid valve assembly including solenoid 518 and core member or piston 534 achieves substantially the same function as that of the stepped piston 418 of the previous embodiment.

A balance piston 520 is arranged in substantially the same manner as that of the balance piston 420 of the previous embodiment. The balance piston 520 thus defines two chambers 511 and 521 and is balanced by means of the fluid pressures within both chambers 511 and 521 and by a pair of springs 538 and 539. An inlet port 510 which is provided in the plug 532 is connected to the variable volume chamber of the anti-skid actuator 100 at one side thereof and to the right rear brake 13a through means of the chamber 511 and an outlet port 514 at the other side thereof. Reference numerals 540 and 541 denote spring retainers and reference numeral 542 denotes a rod member.

An alarming lamp L is turned on when the switch P is turned on to energize the solenoid coil 518 such that the driver can recognize that the other braking line has been interrupted by the ball valve 516 between the tandem master cylinder 11 and the wheel brake 15a.

The remaining parts and operation of the hydraulic pressure control system will be substantially the same as those in the previous embodiment and, therefore, detailed explanation thereof will be omitted. It is noted, however, that the other braking line is electrically and mechanically interrupted by means of the core member or piston 534 and the ball valve 516 in response to energization of the solenoid coil 518.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic pressure control system for a split brake system comprising:
    a tandem master cylinder;
    first and second wheel brakes;
    a first braking line between one of said tandem master cylinders and said first wheel brake;
    a second braking line between the other of said tandem master cylinders and said second wheel brake;
    an anti-skid actuator positioned within said first braking line to thereby decrease and increase braking fluid pressure transmitted to said first wheel brake in response to rotational conditions of wheels, and
    a control valve assembly positioned downstream of said anti-skid actuator communicating with said first braking line between said anti-skid actuator and said first wheel brake at a first side thereof, and communicating with said second braking line at a second side thereof, said control valve assembly comprising normally open valve means interrupting said second braking line when fluid pressure within said first braking line attains a predetermined value, and balance piston means being balanced by means of fluid pressures transmitted to said first and second wheel brakes, respectively, to thereby maintain said fluid pressures of said first and second wheel brakes at the same magnitude.

2. A hydraulic pressure control system as set forth in claim 1, said normally open valve means further comprising a stepped piston having a large diameter portion subjected to the fluid pressure within said first braking line, a valve member urged to a closed position by means of slidable movement of said stepped piston, and means for normally maintaining said valve member in an open position.

3. A hydraulic pressure control system as set forth in claim 1, said normally open valve means further comprising solenoid coil means energized when the fluid pressure within said first braking line attains said predetermined value, a core member movable in response to energization and deenergization of said solenoid coil, a valve member urged to a closed position by movement of said core member, and means for normally maintaining said valve member in an open position.

4. A hydraulic pressure control system as set forth in claim 1 wherein said balance piston means includes a housing having a bore formed therein and a balance piston disposed in said bore so as to form a first and second chamber within said bore.

5. A hydraulic pressure control system as set forth in claim 3 wherein said balance piston means includes a housing having a bore formed therein and a balance piston disposed in said bore so as to form a first and second chamber within said bore.

6. A hydraulic pressure control system as set forth in claim 1 further comprising means for sensing a wheel locked condition and for signaling said locked condition and an air-vacuum change-over valve means communicating with said control valve assembly and operable in response to said wheel locked condition.

7. A hydraulic pressure control system as set forth in claim 3 further comprising means for sensing a wheel locked condition and for signaling said locked condition and an air-vacuum change-over valve means communicating with said control valve assembly and operable in response to said wheel locked condition.

8. A hydraulic pressure control system as set forth in claim 1 wherein said open valve means continuously interrupts said second braking line after fluid pressure within said first braking line attains a predetermined value, and said balance piston means is balanced by means of fluid pressures within said first braking line between said anti-skid actuator and said first wheel brake and fluid pressure within said second brake line between said normally open valve means and said second wheel brake, respectively, to thereby maintain said fluid pressure of said first and second wheel brakes at the same magnitude.

* * * * *